United States Patent
Zywicki et al.

(10) Patent No.: US 10,856,398 B2
(45) Date of Patent: Dec. 1, 2020

(54) HIGH VOLTAGE GENERATOR

(71) Applicant: NIKON METROLOGY NV, Leuven (BE)

(72) Inventors: Janusz Zywicki, Aylesbury (GB); Roger Hadland, Chipperfield (GB)

(73) Assignee: NIKON METROLOGY NV, Leuven (BE)

( * ) Notice: Subject to any disclaimer, the term of this patent is extended or adjusted under 35 U.S.C. 154(b) by 835 days.

(21) Appl. No.: 15/509,348

(22) PCT Filed: Aug. 27, 2015

(86) PCT No.: PCT/EP2015/069632
§ 371 (c)(1),
(2) Date: Mar. 7, 2017

(87) PCT Pub. No.: WO2016/045905
PCT Pub. Date: Mar. 31, 2016

(65) Prior Publication Data
US 2017/0245356 A1    Aug. 24, 2017

(30) Foreign Application Priority Data
Sep. 26, 2014    (GB) .................. 1417121.9

(51) Int. Cl.
*H05G 1/20*    (2006.01)
*H01F 29/12*    (2006.01)
(Continued)

(52) U.S. Cl.
CPC .............. *H05G 1/20* (2013.01); *H01F 27/29* (2013.01); *H01F 27/30* (2013.01); *H01F 29/02* (2013.01);
(Continued)

(58) Field of Classification Search
None
See application file for complete search history.

(56) References Cited

U.S. PATENT DOCUMENTS 2,572,455 A    10/1951    Dunn
3,600,669 A    8/1971    McClain
(Continued)

FOREIGN PATENT DOCUMENTS

CN    1868026    11/2006
CN    104113976    10/2014
(Continued)

OTHER PUBLICATIONS

Examination Decision in related EP Application No. 15 762 949. 4-1212 dated Oct. 17, 2018, 4 pages.
(Continued)

*Primary Examiner* — Thomas R Artman
(74) *Attorney, Agent, or Firm* — Andrew M. Calderon; Roberts Calderon Safran & Cole, P.C.

(57) ABSTRACT

Disclosed is a high-voltage generator for an x-ray apparatus. The generator comprises a voltage multiplier having a high-voltage output terminal and first and second alternating-current input terminals, an output transformer coil (12) having first and second output terminals respectively electrically connected to the first and second input terminals of the voltage multiplier, and an input transformer coil (11) having first and second input terminals and being arranged coaxially with and inductively coupled to the output transformer coil. The input and output transformer coils are relatively axially movable. Disclosed is also an x-ray apparatus using the high-voltage generator, a method of configuring a high-voltage generator and a method of configuring a high-voltage apparatus.

19 Claims, 4 Drawing Sheets

(51) Int. Cl.

| | | |
|---|---|---|
| *H05G 1/26* | (2006.01) | |
| *H05G 1/32* | (2006.01) | |
| *H01F 27/30* | (2006.01) | |
| *H01F 27/29* | (2006.01) | |
| *H01F 29/02* | (2006.01) | |
| *H02M 7/04* | (2006.01) | |

(52) U.S. Cl.
CPC ............ *H01F 29/12* (2013.01); *H02M 7/043* (2013.01); *H05G 1/265* (2013.01); *H05G 1/32* (2013.01)

(56) References Cited

U.S. PATENT DOCUMENTS

| | | | |
|---|---|---|---|
| 3,628,125 A | 12/1971 | Dedleu | |
| 3,846,666 A | 11/1974 | Suzuki et al. | |
| 3,939,351 A | 2/1976 | Mester | |
| 4,360,735 A | 11/1982 | Seifert | |
| 4,723,259 A | 2/1988 | Amor et al. | |
| 4,839,915 A * | 6/1989 | Kaneko | H02M 3/3376 363/17 |
| 5,696,807 A | 12/1997 | Hsieh | |
| 2006/0210020 A1 | 9/2006 | Takahashi et al. | |
| 2012/0076276 A1 | 3/2012 | Wang et al. | |
| 2013/0170608 A1 | 7/2013 | Weedon | |
| 2017/0245356 A1* | 8/2017 | Zywicki | H05G 1/20 |

FOREIGN PATENT DOCUMENTS

| | | |
|---|---|---|
| GB | 1302342 A | 1/1973 |
| GB | 1357395 | 6/1974 |
| GB | 2086622 A | 5/1982 |
| JP | 46000222 | 8/1971 |
| JP | H089643 | 1/1996 |
| JP | 08009643 | 2/1996 |
| JP | 2009043571 | 2/2009 |
| WO | 2004103033 | 11/2004 |
| WO | 2010111697 | 9/2010 |

OTHER PUBLICATIONS

Chinese Office Action and Search Report in related CN Application No. 2015800512731 dated Apr. 17, 2019, 15 pages.
"YDJ(YDM) oil immersed, gas-filled AC and DC test transformer", Ojftpcazcv, "Baidu Library", Feb. 3, 2011, pp. 22.
Japanese Office Action in related JP Application No. 2017-516487, drafted Apr. 17, 2018 and dated Apr. 23, 2018, 11 pages.
Search Report in related GB Application No. GB1417121.9 dated Jan. 29, 2016, 2 pages.
Search Report in related GB Application No. GB1417121.9 dated May 22, 2015, 3 pages.
International Search Report and Written Opinion, dated Dec. 11, 2015, 14 pages.
Zeting et al., "Filament Power Supply Designed for Electron Beam Welder Based on STM32", PLC&EAS, 2013, pp. 68-71.
Chinese Office Action and Search Report in related CN Application No. 201580051273.1, dated Jul. 30, 2018, 15 pages.

* cited by examiner

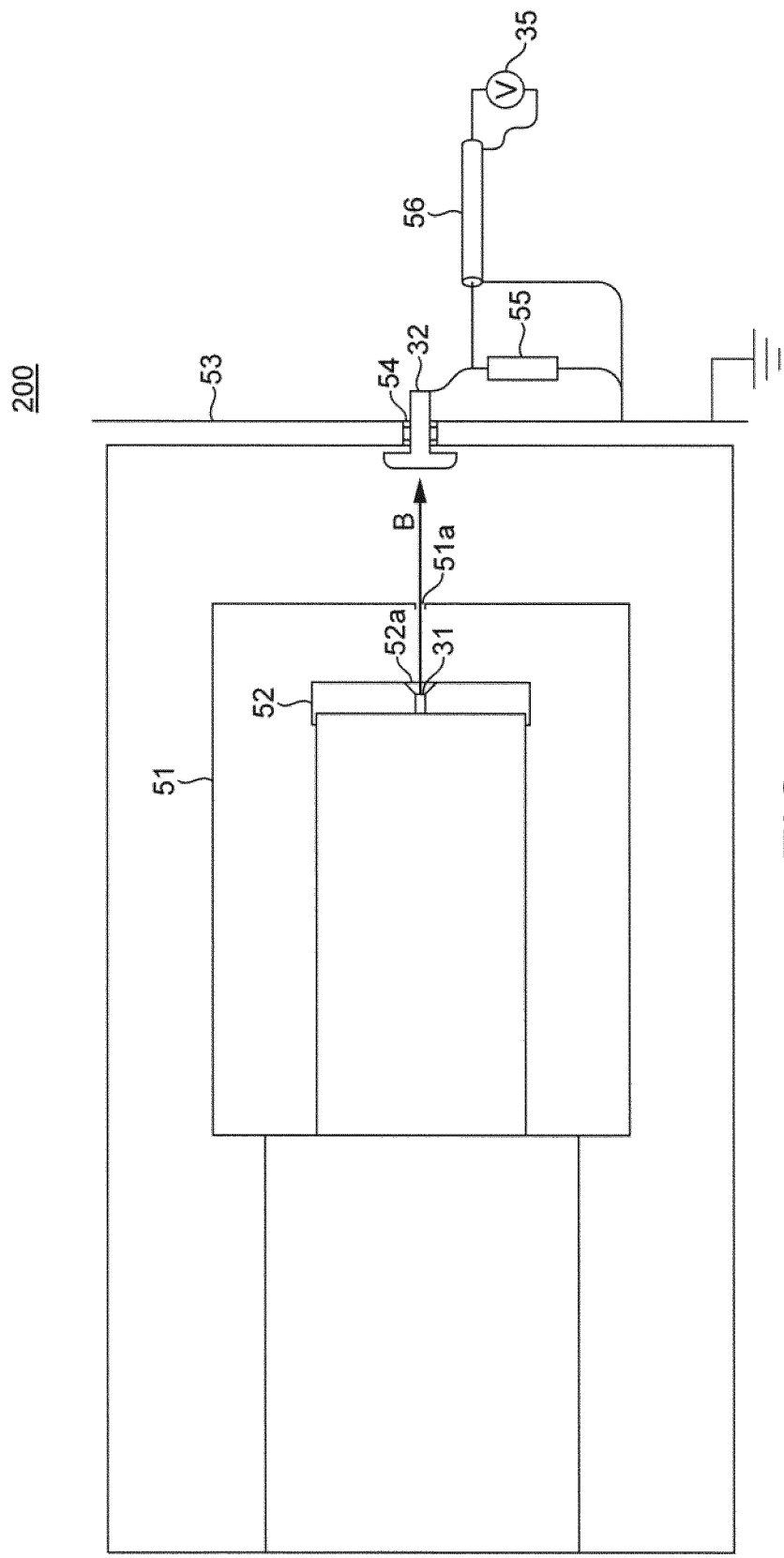

HIGH VOLTAGE GENERATOR

FIELD OF THE INVENTION

The present disclosure relates to a high voltage generator for an x-ray apparatus, and also to an electron beam generator comprising the high-voltage generator, as well as an x-ray apparatus comprising the electron-beam generator. The present disclosure also relates to a method of configuring the high voltage generator and a method of configuring the x-ray apparatus.

BACKGROUND ART

Modern x-ray generation apparatus, especially that used for imaging purposes, usually employs an electron beam incident on a high-Z (high-atomic-number) target, typically a tungsten target, in order to generate the x-ray beam. Typically, generation of an electron beam involves producing electrons by thermionic emission from a heated cathode elevated to a high negative potential, typically in excess of 80 kV, and acceleration of the electrons thereby produced towards an anode held at a relatively lower negative potential as compared with the cathode.

Conventionally, voltage multipliers are used to achieve the high voltage required for high beam energies from a relatively low-voltage drive source. However, natural variations in the properties of components used in the voltage multiplier, as well as imperfect drive circuitry, can lead to the generation of electrical stresses in the voltage multiplier as well as reduced performance as compared with the theoretical ideal performance of a given high-voltage generator configuration.

The performance of the x-ray apparatus is typically very dependent on the quality of the electron beam and the reliability of the apparatus employed to generate it.

Therefore, there exists a need for configurations of high-voltage generators which are able more closely to realise optimal performance, as well as methods of adjusting such generators so as to achieve such performance.

SUMMARY

According to a first aspect, there is provided a high-voltage generator for an x-ray apparatus comprising: a voltage multiplier having a high-voltage output terminal and first and second alternating-current input terminals; an output transformer coil having first and second output terminals respectively electrically connected to the first and second input terminals of the voltage multiplier; and an input transformer coil having first and second input terminals and being arranged coaxially with and inductively coupled to the output transformer coil, wherein: the input and output transformer coils are relatively axially movable.

In one configuration, the output coil has a centre tap between the first and second input terminals for defining a reference voltage of the voltage multiplier.

In one configuration, the centre tap has an equal number of coil windings on each side.

In one configuration, the input and output coils are cylindrical.

According to a second aspect, there is provided a high-voltage generator for an x-ray apparatus comprising: a voltage multiplier having a high-voltage output terminal, first and second alternating-current input terminals and a reference terminal; and a transformer having an output transformer coil, the output transformer coil having first and second output terminals respectively electrically connected to the first and second input terminals of the voltage multiplier and a centre tap arranged at a position on the coil intermediate of the first and second output terminals connected to the reference terminal; wherein the transformer is adjustable such that the voltages provided at the first and second output terminals relative to the centre tap are adjustable.

In one configuration, the voltage multiplier is a full-wave Cockroft-Walton voltage multiplier.

In one configuration, the voltage multiplier is one of a plurality of voltage multipliers arranged in series as a multistage voltage multiplier.

According to a third aspect, there is provided an electron-beam generator comprising the high-voltage generator according to one of the first and second aspects; an electron emission cathode; and an anode, wherein an output of the high-voltage generator is electrically connected to the electron emission cathode and the anode is electrically connectable to ground.

According to a fourth aspect, there is provided an x-ray apparatus comprising the electron-beam generator according to the third aspect and an x-ray target for irradiation by an electron beam emitted from the anode towards the cathode.

In one configuration, the x-ray apparatus further comprises a beam-current ripple measurement device arranged to measure a beam-current ripple of the beam incident on the x-ray target.

In one configuration, the beam-current ripple measurement device comprises: a resistor electrically connected between the x-ray target and the anode in a state in which the anode is connected to ground; and a voltage-measurement device arranged to measure the voltage drop across the resistor.

In one configuration, the x-ray apparatus further comprises a high-voltage ripple measurement device arranged to measure a high-voltage ripple of the voltage multiplier.

In one configuration, the high-voltage ripple measurement device comprises: a capacitor formed between i) a reference electrode electrically connected to the output terminal of the voltage multiplier and ii) the anode in a state in which the anode is isolated from a direct connection to ground; an isolator adapted to isolate the anode from a direct connection to ground; a resistor electrically connected between the anode and ground; a coaxial cable having conductors electrically connected respectively to the anode and ground; and a voltage-measurement device arranged to measure the voltage drop across the resistor via the coaxial cable.

In one configuration, the reference electrode is a shield electrode provided to surround at least a portion of the high-voltage generator.

In one configuration, the reference electrode is a shield electrode provided to surround at least a portion of the anode.

In one configuration, the isolator is a non-conductive element arranged between the anode and a grounded part.

According to a fifth aspect, there is provided a method of configuring a high-voltage generator according to the first aspect, comprising: measuring a high-voltage ripple at the output terminal of the voltage multiplier; and relatively moving input and output coils of the transformer to achieve a reduction in the ripple magnitude or an improvement in the ripple symmetry.

According to a sixth aspect, there is provided a method of configuring an x-ray apparatus according to the third aspect, comprising: measuring one of a high-voltage ripple at the output terminal of the voltage multiplier and a beam-current ripple of the beam incident on the x-ray target; and relatively moving input and output coils of the transformer to achieve a reduction in the ripple magnitude or an improvement in the ripple symmetry.

Effects and advantages of each of these aspects and their various configurations and variants will be apparent from the following disclosure.

BRIEF DESCRIPTION OF THE DRAWINGS

For a better understanding of the present disclosure, and to show how the same may be carried into effect, reference will be made, by way of example only, to the accompanying Drawings, in which:

FIG. 5 shows an x-ray apparatus according to a second embodiment of the present invention.

DETAILED DESCRIPTION

The present inventors have realised that the voltage ripple at the output of a high-voltage generator is an important indicator of the degree of overall electrical symmetry in a high-voltage generator, and is an appropriate parameter to measure, and on the basis of which to optimise, the symmetry. The present inventors have also realised that by providing an adjustable drive transformer, in which the symmetry of the transformer is adjustable, especially by making the input and output transformer coils are relatively axially movable, the overall symmetry of the high-voltage generator can be adjusted and the overall performance improved.

Figure 1:
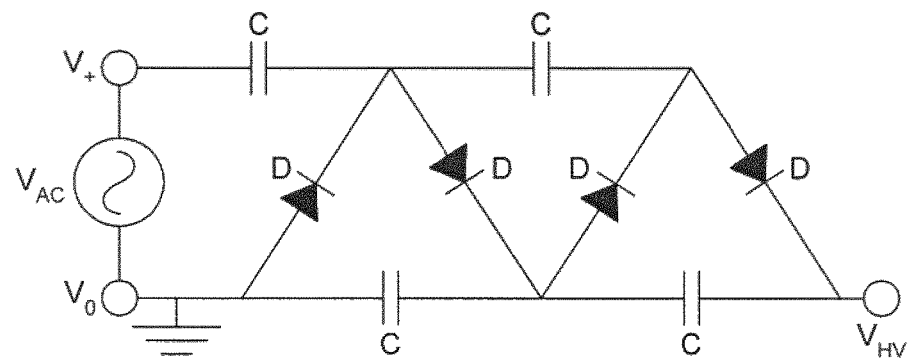
FIG. 1 shows a typical or half-wave Cockroft-Walton voltage multiplier.

A typical voltage multiplier used in a high-voltage generator for x-ray apparatus is the Cockroft-Walton generator, shown in FIG. 1. In the Cockroft-Walton generator, a ladder network of capacitors C and diodes D is used to transform an input alternating voltage, shown as $V_{AC}$ in FIG. 1, applied between input terminal $V_+$ and reference terminal $V_0$ to a high-voltage, presented at output terminal $V_{HV}$. The high voltage is generated relative to reference terminal $V_0$, which may be imagined to be grounded.

As shown, the Cockroft-Walton network, which is the basis of the Cockroft-Walton generator, consists of two series arrangements of the same number of nominally identical capacitors with nominally identical diodes arranged in parallel between the series arrangements. The diodes are arranged with alternating forward directions and connect the output of each capacitor in one series (the first series) with the input of the corresponding capacitor in the other series (the second series). Thus, the output of the nth capacitor in the first series is connected by a diode which has a forward direction arranged from the first series to the second series with the input of the nth capacitor in the second series, and the output of the nth capacitor in the second series is connected by a diode which has a forward direction arranged from the second series to the first series with the input of the n+1th capacitor in the first series. Although ideally $V_{HV}$ would provide a steady-state DC current and voltage source, in practice, an oscillating AC component is present in the rectified voltage and current at $V_{HV}$, termed the output ripple.

Figure 2:
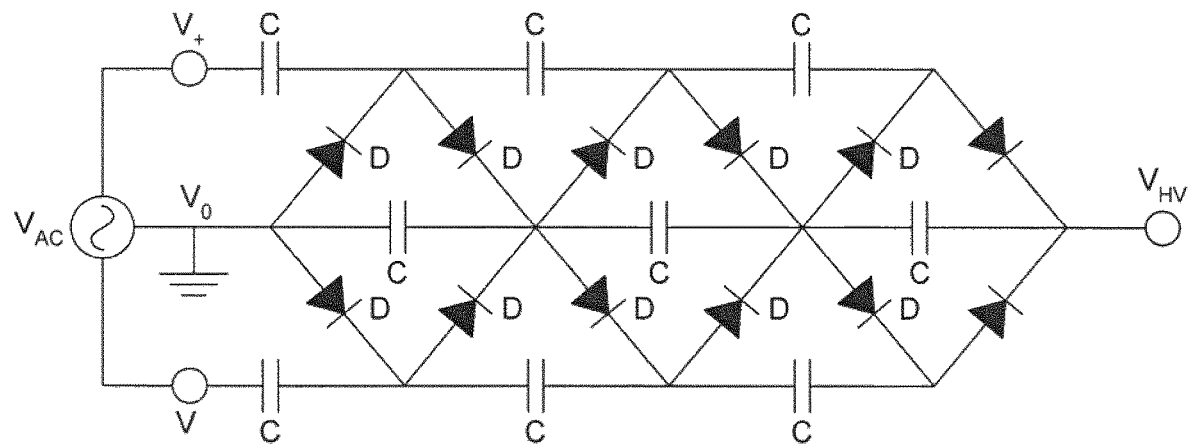
FIG. 2 shows a typical full-wave Cockroft-Walton voltage multiplier.

Although the so-called half-wave configuration shown in FIG. 1 is the simplest type of Cockroft-Walton generator, a further variant is shown in FIG. 2. Specifically, FIG. 2 shows a so-called full-wave Cockroft-Walton, which can be thought of as two half-wave networks arranged in parallel, sharing one, common, series of capacitors. So-called in-phase and out-of-phase input terminals $V_+$ and $V_-$ of the respective non-common capacitor series are driven out of phase with each other, relative to the central $V_0$ reference terminal, which is connected to the common series of capacitors and which defines a reference voltage for the generator. Reference terminal $V_0$ may be imagined to be grounded. As the voltages on the input drive terminals $V_+$ and $V_-$ oscillate in anti-phase about the reference voltage of the central $V_0$ reference terminal, the network generates a rectified DC voltage, relative to the reference voltage, at output terminal $V_{HV}$.

As compared with the configuration of FIG. 1, the configuration of FIG. 2 is able to deliver a relatively higher output power than the half-wave configuration of FIG. 1 with a relatively reduced ripple magnitude but a relatively doubled ripple frequency, with equivalent AC drive supply. Therefore, it is commonly used in x-ray generators.

The output ripple is characterised both by its average magnitude over time and by its symmetry. Symmetric ripple waveforms have successive peaks of the rectified output identical and symmetric with respect to time. Asymmetric ripple waveforms are characterised by alternating peaks of differing magnitude and/or which are not symmetric in time, that is, their rising and falling sides are of different shapes. Symmetric ripple waveforms are associated with relatively lower ripple average magnitude over time, relatively higher output voltage and thus relatively higher efficiency of high voltage generation.

Each of the voltage generators of FIG. 1 and FIG. 2 is driven by an oscillating voltage shown as $V_{AC}$. In FIG. 1, $V_{AC}$ is connected between the reference terminal $V_0$ of the voltage multiplier and the input terminal $V_+$ of the voltage multiplier. In the configuration of FIG. 2, the oscillating input voltage $V_{AC}$, which is taken to oscillate with a given magnitude about the reference voltage $V_0$, is connected between the two out-of-phase input terminals $V_+$ and $V_-$ of the full-wave Cockroft-Walton voltage multiplier, with the central $V_0$ terminal being connected to a voltage source defining the reference voltage $V_0$, typically ground.

Often, the oscillating voltage $V_{AC}$ is provided by a high-voltage step-up transformer consisting of a secondary or output coil connected to the input terminals of the voltage multiplier, and a primary or input coil arranged coaxially with and inductively coupled to the output coil. When the input coil is driven by a suitable lower-voltage AC source, the output coil drives the voltage multiplier according to the output AC voltage, which is related to the input AC voltage according to the inductive coupling between the input and output coils. By increasing the number of windings on the output coil as compared with the input coil, the output coil produces a relatively greater voltage across its output terminals than the input voltage provided across the input terminals of the input coil, and thus provides an initial voltage increase in the high-voltage generator.

For driving the full-wave configuration of FIG. 2, and similar networks, it is typical to use a transformer with a centre-tapped output coil, in which the respective output terminals provided at respective ends of the output coil are connected to the $V_+$ and $V_-$ input terminals and the centre coil tap is connected to the $V_0$ reference terminal, thereby determining the reference voltage for the high voltage generator.

Figure 3:
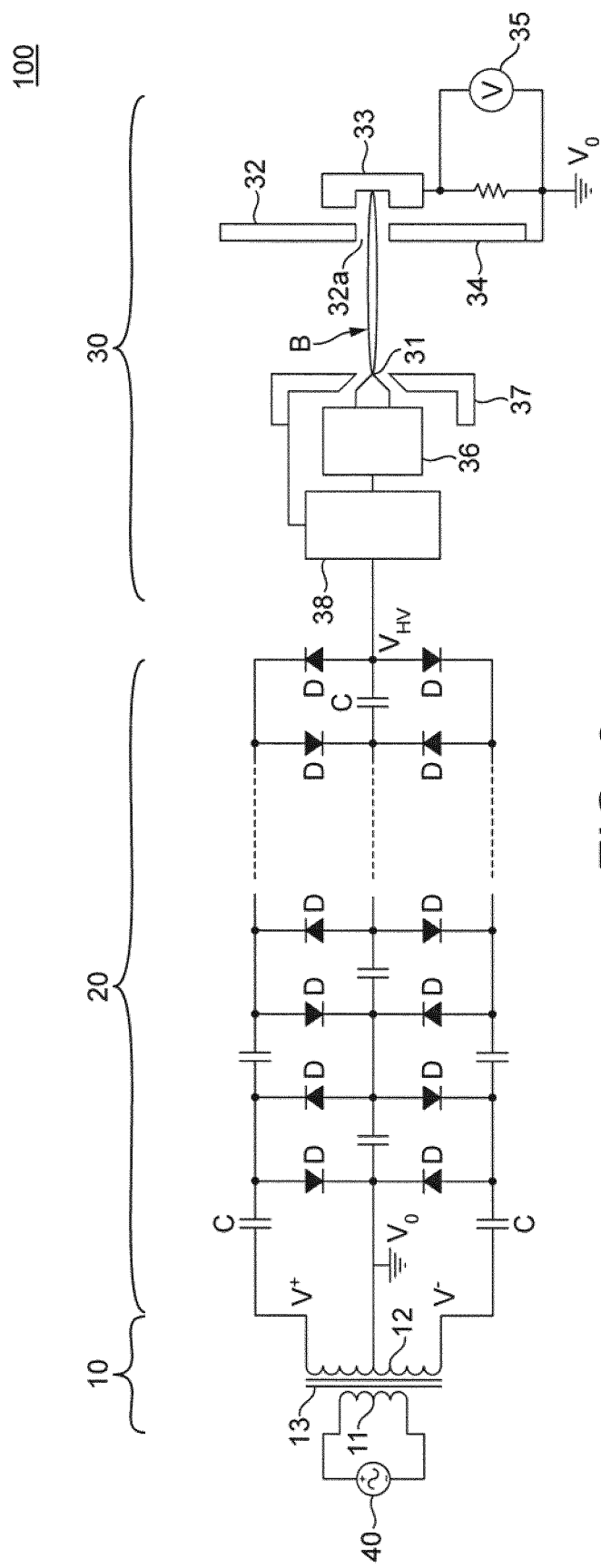
FIG. 3 shows an x-ray apparatus according to a first embodiment of the present invention.

FIG. 3 shows an application of the voltage multiplier of FIG. 2 in an x-ray apparatus according to a first embodiment of the present invention.

X-ray apparatus 100 shown in FIG. 3 has three principal sections. The first section is a drive transformer section 10, comprising input coil 11, output coil 12, and transformer core 13. Output coil 12 is cylindrically wound around input coil 11, and has an appropriately greater number of windings per unit length than input coil 11, over the same actual length of coil. Output coil 12 provides out-of-phase output terminals at each end and a central coil tap located between the output terminals. The central tap is preferably arranged such that the same number of turns of the output coil 12 are arranged on either side of the central tap, such that the voltages generated at each end of the coil are equal in magnitude but opposite in phase relative to the centre tap. Input coil 11 is driven by AC supply 40, which may, for example, be derived from a high frequency inverter.

The output terminal at each end of secondary transformer coil is connected to the respective drive input of voltage multiplier 20, which has essentially the same configuration as that shown in FIG. 2. The central tap of secondary transformer coil 12 is connected to the reference input of voltage multiplier 20, either directly or via connection to a common reference ground.

The output of the voltage multiplier is arranged to supply a high voltage to the electron-beam generation section 30, which comprises a heated output cathode 31 for generating an electron beam B, a Wehnelt cylinder 37 surrounding the cathode at least on an plane perpendicular to an axis defined by the beam B, a grounded anode 32 having an aperture 32a for transmission of the electron beam, and an x-ray generation target 33. The Wehnelt cylinder 37 is sometimes teamed the grid, and is held at a slightly less negative potential than cathode 31 to shape the beam. The output cathode 31 is here a filament heated by electric current to achieve thermionic emission of electrons. The relative potentials of the Wehnelt cylinder 34 and cathode 31 are controlled by grid controller while the cathode 31 is heated by passing a current through it, controlled by filament supply 36. X-ray target 33 is formed of a high-Z material such as tungsten, such that when the electron beam emitted from cathode 31 impinges on target 33, x-rays are thereby produced. At least x-ray generation section 30 shown in FIG. 3 is typically enclosed in a grounded vacuum enclosure in order to enable transmission of the electron beam emitted from cathode 31 over relatively long distances inside the enclosure.

Transformer section 10 of the embodiment shown in FIG. 3 is configured to enable the input coil 11 and output coil 12 to be relatively axially movable with respect to each other. This configuration is shown in FIG. 4.

Figure 4:
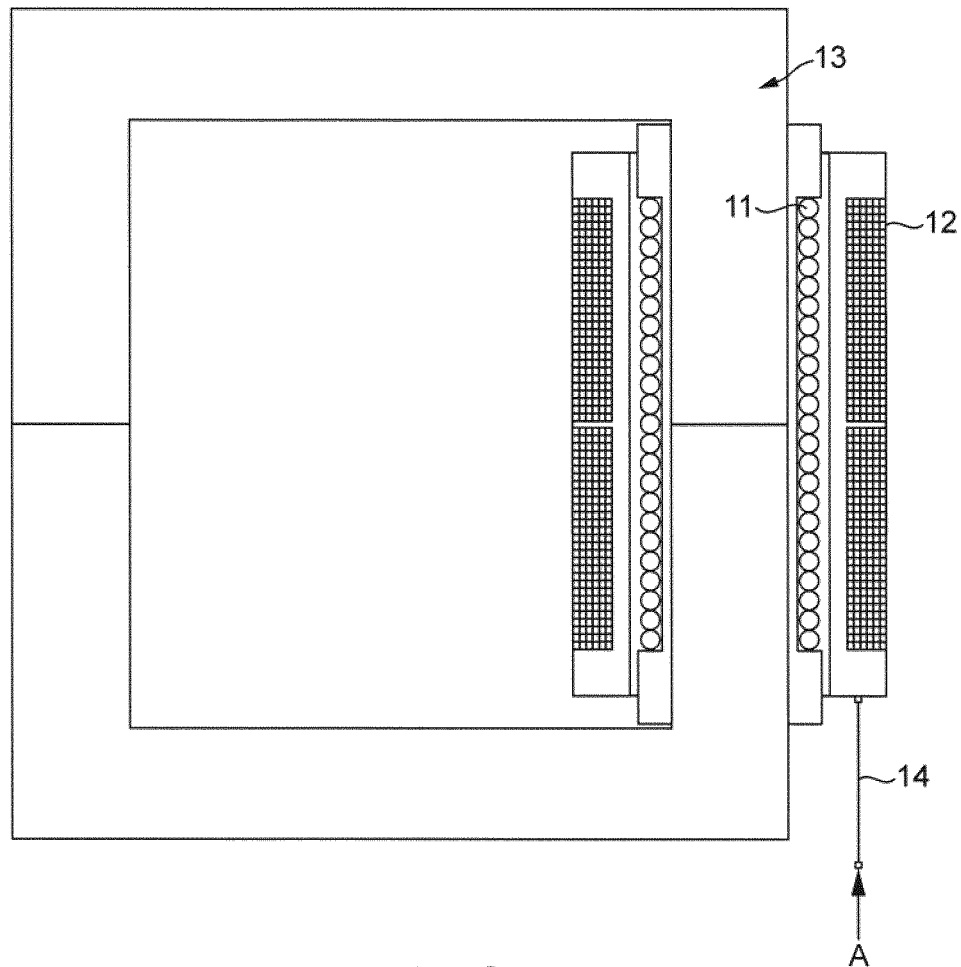
FIG. 4 shows a transformer configuration usable with the present invention.

In FIG. 4, output coil 12 is shown as being cylindrically wound on an appropriate former so as to coaxially surround input coil 11. Input coil 11 is also cylindrically wound on a suitable former, and surrounds transformer core 13. Here, coaxially is used in the sense of the input and output coils having a common axial direction, rather than necessarily having a common axis in space.

However, unlike a conventional input transformer for a high-voltage generator, output coil 12 may be displaced axially along input coil 11 by means of rod 14, which can be moved, for example, by a knob, a lever, or a set screw. By moving the output coil axially relative to the input coil, the number of turns of the input and output coils respectively adjacent on each half of the transformer are varied. Accordingly, the magnitudes of the voltages developed at each end of the secondary winding 12 with respect to the notionally grounded central tap are adjusted. Thereby, the input voltages to each side of the voltage multiplier section 20 are also mutually adjusted, relative to the reference input.

This configuration is different from known input transformer configurations, which are typically fixed in terms of the relative position of the input transformer coil and the outer output transformer coil before the transformer is incorporated into the high-voltage generator.

Such a configuration allows for the overall symmetry of the drive waveform to be adjusted and asymmetries in the voltage thereby to be compensated, such that the overall symmetry of the high-voltage generator can be improved. Such asymmetries can arise from, for example, winding inaccuracies in the transformer or component value variations of the capacitors and diodes making up the voltage multiplier.

By allowing the symmetry of the drive voltage to be adjusted, and thereby the overall symmetry of the generator to be optimised, the output ripple can be made more symmetric and its overall magnitude reduced. The efficiency of the high-voltage generator can thus be improved.

When configuring the generator of FIG. 3, the operator is able to determine when the position of optimum symmetry is achieved, and thus the position of minimum high voltage ripple at the output of the voltage multiplier is achieved, by monitoring one or both of the magnitude and the symmetry of the ripple in the beam current. The configuration shown in FIG. 3 is arranged to enable such a measurement to more conveniently take place. Particularly, rather than the target 33 being directly connected to ground, target 33 is connected to ground via resistor 34. A voltage measuring device 35, such as an oscilloscope or AC voltmeter, is directly connected across resistor 34, i.e. between target 33 and ground, such as by connection to the grounded enclosure, to allow a measurement of the magnitude of the beam current ripple.

The magnitude of the beam current ripple acts as a proxy for the magnitude of the output voltage ripple of the voltage multiplier. The relative axial positions of the input and output transformer coils may be adjusted by the operator while observing the measured magnitude of the beam current ripple to achieve the minimum beam current ripple magnitude, averaged over time, or maximal ripple waveform symmetry. The position of optimal symmetry is thus achieved, and the input and output transformer coils 11 and 12 may be then permanently set, or temporarily held in position, while the machine is operated. Particularly, the configuration in FIG. 3 may be arranged such that resistor 34 may be bypassed with an appropriate jumper, such that target 33 is held at the same potential as anode 32 during operation, or, if the small voltage difference thereby produced between the target 33 and the anode 32 is tolerable, the resistor can remain configured as shown in FIG. 3 during operation. In such a situation, voltage measurement device 35 may be monitored during operation to ensure that the beam current ripple does not deviate outside acceptable parameters.

While the above disclosure is principally cast with regard to Cockroft-Walton voltage multipliers, and particularly full-wave Cockroft-Walton voltage multipliers, the principle is applicable to adjusting the overall symmetry of other high voltage generators operating on like or related principles, as one skilled in the art may easily determine.

FIG. 5 shows an alternative embodiment of the present invention. While the details of the transformer section and the multiplier section are not shown, they may be considered to be equivalent to those shown in FIG. 3. However, the embodiment of x-ray apparatus shown in FIG. 5 is configured as a multi-stage voltage generator, in which at least two voltage multipliers are arranged in series to provide the required output voltage. The output terminals of a first voltage multiplier are directly connected to input terminals of a second voltage multiplier, but, in the configuration of FIG. 5, a shield electrode 51 is arranged to surround at least part of the second voltage multiplier, thereby to inhibit electrical discharges between the components of the second voltage multiplier and grounded vacuum enclosure 53. A further shield electrode 52 is provided at the output terminals of the second voltage multiplier to surround cathode 31, in a manner similar to the Wehnelt 34 of the embodiment of FIG. 3, thereby to improve the focus of the electron beam. Cathode 31 is supplied with a high voltage from the output terminals of the second voltage multiplier in an analogous manner to cathode 31 of FIG. 3. Electrodes 51 and 52 have respective apertures 51a and 52a positioned so as to permit the passage of the electron beam, propagating in direction B, from the cathode 31 towards the anode 32. Anode 32 is, in the configuration of FIG. 5, isolated from the grounded enclosure 53 or other normally-grounded part, such as a support part by an isolator 54, being here a non-conducting sealing member such as an O-ring. Further voltage multipliers and further shield electrodes can be analogously provided as desired.

By isolating the anode 32 from the enclosure 53, the capacitance between the electrode 51 and the anode 32 can be used as one capacitor of a capacitive voltage divider, which in turn can be used to directly measure the output ripple of the voltage multiplier. Specifically, if a resistor 55 is electrically connected between otherwise isolated anode 32 and grounded enclosure 53, and two conductors of a coaxial cable are respectively connected to the cathode-side and the grounded-side of resistor 55, the capacitance of coaxial cable 56 with resistor 55 completes the capacitive voltage divider and allows a voltage measuring device 35 arranged across the conductors of coaxial cable 56 to measure directly the output voltage ripple.

In the configuration of FIG. 5, the output voltage ripple of the first stage of the voltage multiplier is measured. However, if shield electrode 51 is omitted, capacitance between shield electrode 52, connected to the output of the last stage of the voltage multiplier, and the anode 32 can be used to measure the output voltage ripple of the entire multiplier stage.

Again, as for the configuration of FIG. 3, resistor 55 may be left in place for monitoring of the output ripple during use of the apparatus, or resistor 55 may be bypassed with a conductor to allow the anode to be connected to ground.

Otherwise, adjustment of the symmetry of the arrangement may be performed in a similar way as to the adjustment of the symmetry of the arrangement of FIG. 3, by relatively adjusting the axial positions of the input and output transformer coils.

Notably, the measurement principle using the capacitive voltage divider explained with respect to the multi-stage generator shown in FIG. 5 may also be applied with respect to the single-stage generator shown in FIG. 3, and the direct measurement principle explained with respect to the single-stage generator shown in FIG. 3 may also be applied with respect to the multi-stage generator shown in FIG. 5.

In an alternative configuration, it is possible to adjust the drive symmetry of the transformer by providing input and output coils which may be relatively fixed and permitting adjustment of the position on the output coil of the centre tap relative to the output terminals. Such a movable tap can be implemented by providing a sliding tap contact which traverses the secondary winding along the axial direction. Doing so varies the number of turns of the secondary coil on each side of the tap, and provides an alternative means to adjust the symmetry of the drive voltages The principles and concepts explained above can be applied to a wide variety of high-voltage generators, electron beam generators and x-ray apparatus, without particular limitation. Particularly, the target, electrode, cathode or anode geometry may be varied, and the voltage generator may be multistage or single-stage, shielded or unshielded. Various other means may be used to measure the beam current ripple or output voltage ripple as will be clear to the skilled reader. Various other transformer geometries and drive configurations are possible, without limitation.

It is therefore expected that one skilled in the art would be able to modify and adapt the above disclosure to suit his own circumstances and requirements within the scope of the present invention, while retaining some or all technical effects the same, either disclosed or derivable from the above, in the light of his common general knowledge of the art. All such equivalents, modifications or adaptions fall within the scope of the invention hereby defined and claimed.

The invention claimed is:

1. A high-voltage generator for an x-ray apparatus comprising:
    a voltage multiplier having a high-voltage output terminal and first and second alternating-current input terminals;
    an output transformer coil having first and second output terminals respectively electrically connected to the first and second input terminals of the voltage multiplier; and
    an input transformer coil having first and second input terminals and being arranged coaxially with and inductively coupled to the output transformer coil, wherein:
    the input and output transformer coils are relatively axially movable.

2. The high-voltage generator according to claim 1, wherein the output coil has a centre tap between the first and second input terminals for defining a reference voltage of the voltage multiplier.

3. The high-voltage generator according to claim 2, wherein the centre tap has an equal number of coil windings on each side.

4. The high-voltage generator according to claim 1, wherein the input and output coils are cylindrical.

5. The high-voltage generator according to claim 1, wherein the voltage multiplier is a full-wave Cockroft-Walton voltage multiplier.

6. The high-voltage generator according to claim 1, wherein the voltage multiplier is one of a plurality of voltage multipliers arranged in series as a multistage voltage multiplier.

7. A method of configuring a high-voltage generator according to claim 1, comprising:
    measuring a high-voltage ripple at the output terminal of the voltage multiplier; and
    relatively moving input and output coils of the transformer to achieve a reduction in the ripple magnitude or an improvement in the ripple symmetry.

8. A high-voltage generator for an x-ray apparatus comprising:
- a voltage multiplier having a high-voltage output terminal, first and second alternating-current input terminals and a reference terminal; and
- a transformer having an output transformer coil, the output transformer coil having first and second output terminals respectively electrically connected to the first and second input terminals of the voltage multiplier and a centre tap arranged at a position on the coil intermediate of the first and second output terminals connected to the reference terminal;
- wherein the transformer is adjustable such that the voltages provided at the first and second output terminals relative to the centre tap are adjustable, and
- wherein the voltage multiplier is configured to generate a rectified DC voltage, relative to the reference terminal, at an output terminal, based on voltages on the first and second input terminals oscillating in anti-phase relative to one another, about the reference voltage of the reference terminal.

9. The high-voltage generator for an x-ray apparatus of claim 8, wherein the transformer has an input terminal coil, and the input terminal coil and the output transformer coil are relatively axially movable.

10. A high-voltage generator for an x-ray apparatus comprising:
- a voltage multiplier having a high-voltage output terminal, first and second alternating-current input terminals and a reference terminal; and
- a transformer having an input transformer coil and an output transformer coil, the output transformer coil having first and second output terminals respectively electrically connected to the first and second input terminals of the voltage multiplier and a centre tap arranged at a position on the coil intermediate of the first and second output terminals connected to the reference terminal;
- wherein the transformer is adjustable such that the voltages provided at the first and second output terminals relative to the centre tap are adjustable; and
- an electron emission cathode; and an anode, wherein an output of the high-voltage generator is electrically connected to the electron emission cathode and the anode is electrically connectable to ground.

11. An x-ray apparatus comprising the electron-beam generator according to claim 10 and an x-ray target for irradiation by an electron beam emitted from the cathode towards the anode.

12. The x-ray apparatus according to claim 11, further comprising a beam-current ripple measurement device arranged to measure a beam-current ripple of the beam incident on the x-ray target.

13. The x-ray apparatus according to claim 12, wherein the beam-current ripple measurement device comprises:
- a resistor electrically connected between the x-ray target and the anode in a state in which the anode is connected to ground; and
- a voltage-measurement device arranged to measure the voltage drop across the resistor.

14. The x-ray apparatus according to claim 11, further comprising a high-voltage ripple measurement device arranged to measure a high-voltage ripple of the voltage multiplier.

15. The x-ray apparatus according to claim 14, wherein the high-voltage ripple measurement device comprises:
- a capacitor formed between i) a reference electrode electrically connected to the output terminal of the voltage multiplier and ii) the anode in a state in which the anode is isolated from a direct connection to ground;
- an isolator adapted to isolate the anode from a direct connection to ground;
- a resistor electrically connected between the anode and ground;
- a coaxial cable having conductors electrically connected respectively to the anode and ground; and
- a voltage-measurement device arranged to measure the voltage drop across the resistor via the coaxial cable.

16. The x-ray apparatus of claim 15, wherein the reference electrode is a shield electrode provided to surround at least a portion of the high-voltage generator.

17. The x-ray apparatus of claim 15, wherein the reference electrode is a shield electrode provided to surround at least a portion of the anode.

18. The x-ray apparatus of claim 15, wherein the isolator is a non-conductive element arranged between the anode and a grounded part.

19. A method of configuring an x-ray apparatus according to claim 11, comprising:
- measuring one of a high-voltage ripple at the output terminal of the voltage multiplier and a beam-current ripple of the beam incident on the x-ray target; and
- relatively moving the transformer input coil and the output transformer coil of the transformer to achieve a reduction in the ripple magnitude or an improvement in the ripple symmetry.

* * * * *